United States Patent
Rebinsky

(10) Patent No.: US 9,169,623 B2
(45) Date of Patent: Oct. 27, 2015

(54) WEAR MONITORING SYSTEM FOR TRACK TYPE MACHINE

(71) Applicant: Caterpillar Inc., Peoria, IL (US)

(72) Inventor: Douglas Alexander Rebinsky, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 58 days.

(21) Appl. No.: 13/870,323

(22) Filed: Apr. 25, 2013

(65) Prior Publication Data

US 2014/0324301 A1    Oct. 30, 2014

(51) Int. Cl.
| | |
|---|---|
| E02F 9/26 | (2006.01) |
| E02F 9/02 | (2006.01) |
| B62D 55/30 | (2006.01) |
| B62D 55/08 | (2006.01) |
| G01M 17/007 | (2006.01) |

(52) U.S. Cl.
CPC ............... *E02F 9/267* (2013.01); *B62D 55/08* (2013.01); *B62D 55/30* (2013.01); *E02F 9/02* (2013.01); *G01M 17/007* (2013.01)

(58) Field of Classification Search
CPC ............ E02F 9/267; E02F 9/02; B62D 55/08; B62D 55/30; G01M 17/007
USPC ........ 701/33.9, 31.1, 34.2, 34.4, 50; 305/136, 305/143, 153, 194
See application file for complete search history.

(56) References Cited

U.S. PATENT DOCUMENTS

| | | | |
|---|---|---|---|
| 6,224,172 B1 | 5/2001 | Goodwin | |
| 6,276,768 B1 | 8/2001 | Miller | |
| 6,305,763 B1 | 10/2001 | Oertley | |
| 6,354,678 B1 | 3/2002 | Oertley | |
| 6,431,665 B1* | 8/2002 | Banerjee et al. | 305/144 |
| 6,948,783 B2 | 9/2005 | Hoff | |
| 7,172,257 B2 | 2/2007 | Tamaru et al. | |
| 7,292,918 B2* | 11/2007 | Silvester | 701/33.4 |
| 8,180,533 B2* | 5/2012 | Coers et al. | 701/50 |
| 8,775,017 B2* | 7/2014 | Brusarosco et al. | 701/33.7 |
| 2003/0117017 A1* | 6/2003 | Hoff | 305/143 |
| 2005/0029866 A1 | 2/2005 | Tamaru et al. | |
| 2006/0243839 A9 | 11/2006 | Barscevicius et al. | |
| 2011/0221587 A1* | 9/2011 | Katou | 340/443 |
| 2013/0255354 A1* | 10/2013 | Hawkins et al. | 73/7 |

OTHER PUBLICATIONS

Caterpillar, Inc. "Custom Track Service Handbook", 16th Edition, pp. 1-72 © 1971, 1973, 1974, 1976, 1977, 1979, 1982, 1985, 1987, 1989, 1991, 1993, 1998, 2003, 2007.
Caterpillar®, "How to Measure Undercarriage" (2006), pp. 1-2.
Caterpillar ®, "Cat® Undercarriage System Management" (2001), pp. 1-16.

* cited by examiner

*Primary Examiner* — Rodney Butler
(74) *Attorney, Agent, or Firm* — Finnegan, Henderson, Farabow, Garrett & Dunner, LLP

(57) ABSTRACT

A wear monitoring system is disclosed for use with a track type machine. The wear monitoring system may have at least a first radius sensor configured to generate a first signal indicative of a change in radius of at least one idler wheel, and a displacement sensor configured to generate a second signal indicative of a change in displacement of a track tensioning actuator. The wear monitoring system may also have a controller in communication with the first radius sensor and the displacement sensor. The controller may be configured to determine wear of a track link guided by the at least one idler wheel and tensioned by the track tensioning actuator based on the first and second signals.

19 Claims, 2 Drawing Sheets

WEAR MONITORING SYSTEM FOR TRACK TYPE MACHINE

TECHNICAL FIELD

The present disclosure relates generally to a wear monitoring system and, more particularly, to a wear monitoring system for a track type machine.

BACKGROUND

A track-type mobile machine utilizes tracks located at either side of the machine to propel the machine. The tracks include chains having links pinned end-to-end to form a loop that extends around a drive sprocket and one or more idler wheels, and ground engaging elements known as track shoes connected to each pair of links in the chains. The sprocket is driven by an engine of the machine to rotate the chains and push the track shoes against a work surface, thereby transmitting torque from the engine to the surface in opposition to a desired travel direction of the machine.

Over time, components of the machine wear, creating slack in the tracks between the sprocket and the idler wheel(s). This slack, if unaccounted for, can cause the chains to wear excessively and/or to slip off the drive sprocket and idler wheel(s). When this occurs, the machine is pulled out of service for a time- and labor-intensive service operation. Accordingly, it can be important to periodically adjust tension in the track as components of the track wear.

One attempt to reduce track wear and derailment is disclosed in U.S. Pat. No. 6,948,783 that issued to Hoff on Sep. 17, 2005 ("the '783 patent"). Specifically, the '783 patent discloses a tension adjustment mechanism for a machine. The tension adjustment mechanism includes a sensor that senses the position of an idler, an actuator configured to extend the idler away from a sprocket, and a controller in communication with the sensor and the actuator. Based on the sensed position and a recoil curve stored in memory, the controller determines a force to be applied to the idler to achieve a desired tension in an associated track. The controller then automatically causes the actuator to apply the force to the idler.

While the tension adjustment mechanism of the '783 patent may help to maintain a desired level of track tension within worn components, it may still be less than optimal. In particular, it may be unable to determine when the components of the track are too worn for continued use.

The disclosed wear monitoring system is directed to overcoming one or more of the problems set forth above.

SUMMARY

In one aspect, the present disclosure is related to a wear monitoring system for a track type machine. The wear monitoring system may include at least a first radius sensor configured to generate a first signal indicative of a change in radius of at least one idler wheel, and a displacement sensor configured to generate a second signal indicative of a change in displacement of a track tensioning actuator. The wear monitoring system may also include a controller in communication with the first radius sensor and the displacement sensor. The controller may be configured to determine wear of a track link guided by the at least one idler wheel and tensioned by the track tensioning actuator based on the first and second signals.

In another aspect, the present disclosure is related to a method of monitoring wear of a track type machine. The method may include sensing a change in radius of at least one idler wheel, and sensing a change in displacement of a track tensioning actuator. The method may further include determining wear of a track link guided by the at least one idler wheel and tensioned by the track tensioning actuator based on the change in radius and the change in displacement.

In another aspect, the present disclosure is related to an undercarriage for a track type machine. The undercarriage may include a sprocket, a front idler wheel, a rear idler wheel, and a track tensioning actuator configured to selectively displace the front idler wheel away from the rear idler wheel. The undercarriage may also include a track looped around the sprocket, the front idler wheel, and the rear idler wheel. The track may have a plurality of track links. The undercarriage may further include a first sensor configured to generate a first signal indicative of a change in radius of the front idler wheel, a second sensor configured to generate a second signal indicative of a change in radius of the rear idler wheel, and a third sensor configured to generate a third signal indicative of a change in displacement of the track tensioning actuator. The undercarriage may also include a controller in communication with the first, second, and third sensors. The controller may be configured to determine wear of the plurality of track links based on the first, second, and third signals.

DETAILED DESCRIPTION

Figure 1:
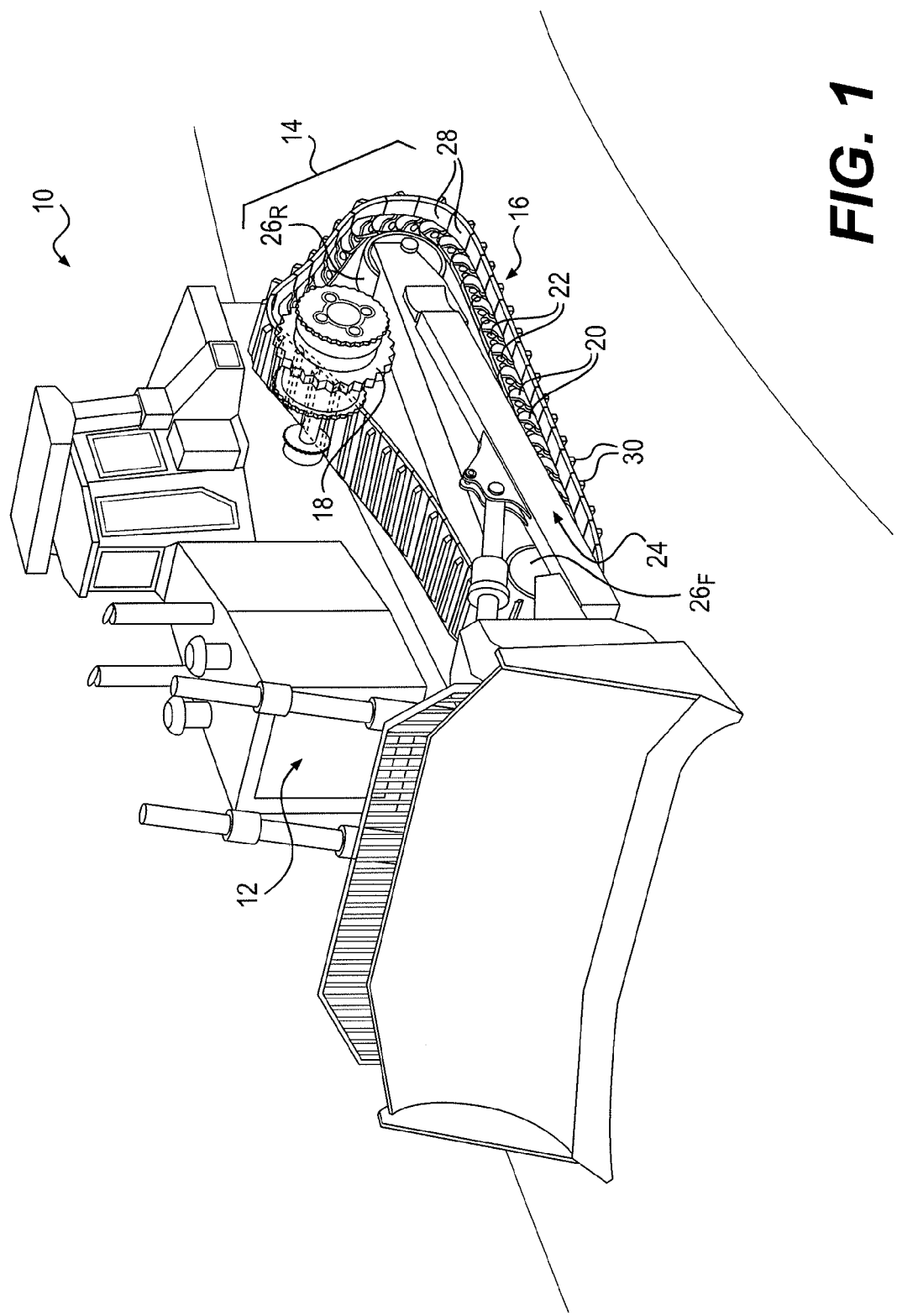
FIG. 1 is an isometric illustration of an exemplary disclosed mobile machine.

FIG. 1 illustrates a track type mobile machine 10 having an engine 12 configured to drive a tracked undercarriage 14. Mobile machine 10 may be any machine that performs an operation associated with an industry such as mining, construction, farming, or any other industry known in the art. For example, machine 10 may be a material moving machine such as a dozer, a loader, an excavator, or another material moving machine.

Undercarriage 14 may include parallel tracks 16 located at opposing sides of machine 10 that are driven by engine 12 via corresponding sprockets 18 (only one track 16 and one sprocket 18 are shown in FIG. 1). Each track 16 may include a plurality of links 20 connected end-to-end via pins 22 to form an endless chain 24. Chains 24 may be wrapped around corresponding sprockets 18 and one or more idler wheels 26 (e.g., a front idler wheel $26_F$ and a rear idler wheel $26_R$ at each side of machine 10). Sprockets 18 may engage bushings (not shown) that encase pins 22 and thereby transmit torque from engine 12 to chains 24. Idler wheels 26 may guide chains 24 in a general elliptical trajectory around sprockets 18. Individual track shoes 30 may be removably connected to pairings of links 20 of in each chain 24, and function to transmit the torque of chains 24 as a driving linear force into a ground surface.

Figure 2:
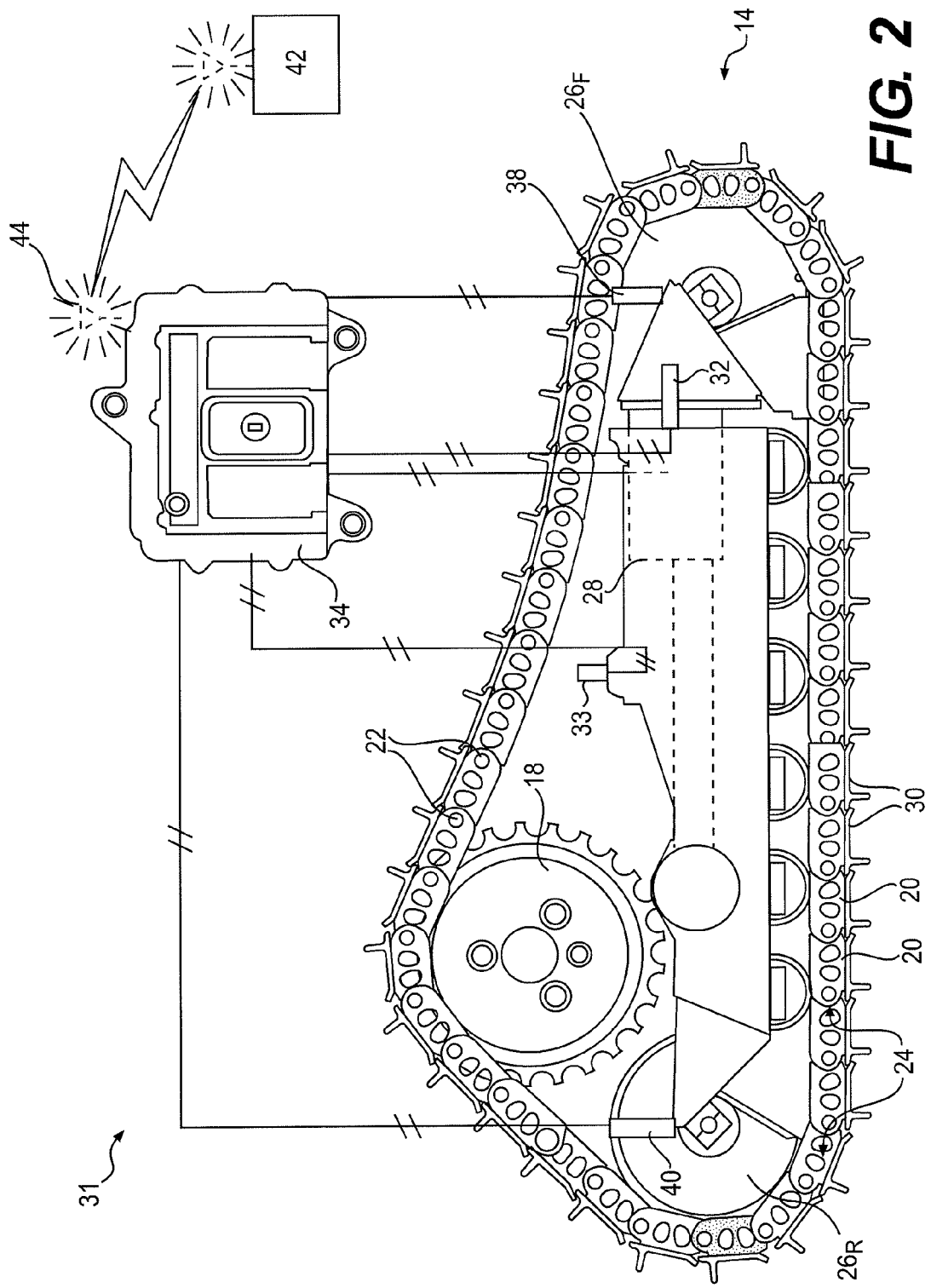
FIG. 2 is a diagrammatic illustration of a wear monitoring system that may be used in conjunction with the mobile machine of FIG. 1.

As shown in FIG. 2, undercarriage 14 may further include a track tensioning actuator ("actuator") 28 configured to displace front idler wheel $26_F$ away from rear idler wheel $26_R$ (or away from sprocket 18 in a low-sprocket configuration not having rear idler wheel $26_R$), so as to maintain a desired level of tension in chain 24. Actuator 28 may take any conventional form known in the art. For example, actuator 28 may be a grease cylinder that, when manually filled with grease, extends to push front idler wheel $26_F$. Alternatively, actuator 28 may be a fluid cylinder having one or more chambers automatically filled with fluid pressurized by an onboard source, the pressurized fluid acting on a piston/rod combination to move front idler wheel $26_F$. It is contemplated that other manual, automatic, linear, and/or rotary configurations of actuator 28 may also or alternatively be utilized, as desired.

As components of undercarriage 14 wear, the tension of track 16 reduces. For example, the radii of front idler wheel $26_F$ and rear idler wheel $26_R$ may reduce due to metal-on-metal contact of these components with links 20 and/or contact of these components with abrasive debris in the environment. As these components wear, the circumferential trajectory of chain 24 around front and rear idler wheels $26_F$, $26_R$ reduces. Similarly, the radial thickness or height of links 20 reduces due to the same interaction, and causes a corresponding increase in the internal circumferential length of chain 24. The increased length of chain 24, coupled with the reduced trajectory of chain 24 around front and rear idler wheels $26_F$, $26_R$, results in sagging of track 16 at locations between sprocket 18 and front idler wheel $26_F$ (when traveling in a forward direction) and between sprocket 18 and rear idler wheel $26_R$ (when traveling in a reverse direction). An increasing displacement of actuator 28 may account for component wear by increasing the circumferential trajectory of chain 24 around sprocket 18 and front and rear idler wheels $26_F$, $26_R$ to substantially match the internal circumferential length of chain 24, thereby maintaining a desired tension in track 16.

Eventually, the component wear of undercarriage 14 may be too great for actuator 28 to accommodate and/or great enough to weaken the components of undercarriage 14. When this happens, the worn components should be replaced. As shown in FIG. 2, machine 10 may include a component wear monitoring system ("system") 31 configured to monitor the wear of undercarriage 14.

System 31 may include, among other things, one or more radius sensors associated with front idler wheel $26_F$ and/or rear idler wheel $26_R$ (assuming two idler wheels are being utilized, as in the disclosed high-sprocket arrangement), a displacement sensor 32 associated with actuator 28, a sag sensor 33 associated with chain 24, and a controller 34 in communication with each of these sensors. In the disclosed embodiment, system 31 includes two different radius sensors 38, 40, one associated with each of front idler wheel $26_F$ and rear idler wheel $26_R$, respectively. Based on signals from each of the sensors of system 31, controller 34 may be configured to determine wear and/or sagging of undercarriage 14.

Each of sensors 38, 40 may be configured to generate a corresponding signal indicative of a change in radius of the associated components. For example, radius sensor 38 may be configured to generate a first signal indicative of a change in the radius of front idler wheel $26_F$, and radius sensor 40 may be configured to generate a second signal indicative of a change in the radius of rear idler wheel $26_R$. Each of sensors 38, 40 may embody, for example, an ultrasonic sensor having a transducer embedded within the corresponding wheel that generates high-frequency sound waves within the corresponding part, and then evaluates a resulting echo that is received back by the sensor. A time interval between sending the signal and receiving the echo is then calculated (either by the sensor or by controller 34) to determine a distance to an outer annular surface of the part (i.e., to the radius of the part). As the part wears, this time interval may decrease, and the signal generated by the corresponding radius sensor may be indicative of the wear (i.e., of the reduction in radius).

In another example, sensors 38, 40 may be proximity sensors. Proximity sensors emit electromagnetic fields or beams of electromagnetic radiation that are intended to bounce off of mating components (e.g., components such as links 20, front idler wheel $26_F$, and/or rear idler wheel $26_R$). The proximity sensors then look for changes in the fields or signals, and correlate the changes to the decrease in dimension. It is contemplated that other types of sensors may alternatively be utilized. The signals generated by sensors 38, 40 may be sent to controller 34 via hard-wired connections or wirelessly, as desired.

Displacement sensor 32 may be any type of device configured to measure a change in the distance between front and rear idler wheels $26_F$, $26_R$ (or the change in distance between front idler wheel $26_F$ and sprocket 18 in the low-sprocket configuration not having rear idler wheel $26_R$) caused by extension of actuator 28. Exemplary displacement sensors may include magnetostrictive sensors, acoustic sensors, ultrasonic sensors, and cable sensors. Signals generated by displacement sensor 32 may be sent to controller 34 via hard-wired connections or wirelessly, as desired.

Sag sensor 33 may be any type of sensor known in the art capable of detecting deviation of chain 24 from a theoretical straight line tangential path between sprocket 18 and front idler wheel $26_F$. In one example, sag sensor 33 is a proximity sensor like that described above. It is contemplated, however, that sag sensor 33 may be another type of sensor, as desired. Signals generated by sag sensor 33 may be sent to controller 34 via hard-wired connections or wirelessly.

Controller 34 may embody a single microprocessor or multiple microprocessors that include a means for controlling an operation of system 31. Numerous commercially available microprocessors can be configured to perform the functions of controller 34. It should be appreciated that controller 34 could readily be embodied in a general machine microprocessor capable of controlling numerous machine functions. Controller 34 may include a memory, a secondary storage device, a processor, and any other components for running an application. Various other circuits may be associated with controller 34 such as power supply circuitry, signal conditioning circuitry, solenoid driver circuitry, and other types of circuitry.

One or more maps relating the signals from displacement sensor 32, sag sensor 33, and/or radius sensors 38, 40 with wear values for components of undercarriage 14 may be stored in the memory of controller 34. Each of these maps may include a collection of data in the form of tables, graphs, and/or equations. As will be described in more detail below, controller 34 may be configured to select specific maps from available relationship maps stored in the memory of controller 34 to automatically determine and/or accommodate component wear.

In some embodiments, system 31 may be able to communicate with an offboard entity 42. In particular, system 31 may equipped with a communication device 44 connectable with controller 34. Communication device 44 may be configured to communicate messages wirelessly between controller 34 and offboard entity 42. The wireless communications may include satellite, cellular, infrared, and any other type of wireless communication. Offboard entity 42 may be, for example, service personnel, and the communications may include messages regarding wear values, identification of worn undercarriage components, and/or instructions for the service personnel. The instructions may be associated with directing the service personnel to provide quotes for replacement undercarriage components to the owner of machine 10 and/or to schedule service of machine 10 with the owner.

INDUSTRIAL APPLICABILITY

The wear monitoring system of the present disclosure may be applicable to any track-type mobile machine. The disclosed wear monitoring system may provide a way to actively monitor wear of undercarriage components, accommodate the wear, and alert service personnel when the wear becomes excessive. Operation of wear monitory system 31 will now be described in detail.

Controller 34 may determine wear of links 20 based on signals from displacement sensor 32, and/or radius sensors 38, 40. Specifically, controller 34 may determine the average wear of each pair of links 20 (i.e., the average reduction in radial thickness or height of each pair of links 20) within chain 24 based directly on a difference between the change in displacement of actuator 28 and the combined reductions in dimensions of front idler wheel $26_F$ and rear idler wheel $26_R$, according to the following equation:

$$\Delta T_L \approx \frac{(\delta - \Delta R_{FIW} - \Delta R_{RIW})}{n}$$

wherein:
$\Delta T_L$ is the average change in radial thickness or height of a pair of links 20;
$\delta$ is the change in displacement of actuator 28;
$\Delta R_{FIW}$ is the change in radius of front idler wheel $26_F$;
$\Delta R_{RIW}$ is the change in radius of rear idler wheel $26_R$ (if present); and
n is the number of chain contact points (n=2 for high-sprocket configuration;
n=1 for low-sprocket configuration not having rear idler wheel $26_R$).

As can be seen in this equation, the amount that actuator 28 displaces from a new track position to a worn track position is intended to remove slack created by a combination of worn components. These worn components primarily include links 20, front idler wheel $26_F$, and rear idler wheel $26_R$. In other words, the reduction in radii of front idler wheel $26_F$ and rear idler wheel $26_R$, in combination with the reduction in radial thicknesses of links 20 (i.e., in combination with the combined radial thickness reductions at each contact point between links 20, front idler wheel $26_F$, and rear idler wheel $26_R$) may account for a majority of the slack in track 16. Accordingly, by subtracting the change in radius of front idler wheel $26_F$ and rear idler wheel $26_R$ from the change in displacement of actuator 28, the combined average height reduction of all links 20 in contact with front idler wheel $26_F$ and rear idler wheel $26_R$ may be determined. In a high-sprocket configuration (shown in FIGS. 1 and 2), two different links 20 (shaded in FIG. 2) may be in primary contact with front idler wheel $26_F$ and rear idler wheel $26_R$ at any given time and, accordingly, the combined amount of height reduction should be divided by two to determine the average height reduction of each pair of links 20. In a low-sprocket configuration (not shown), only one link 20 may be in primary contact with front idler wheel $26_F$ (rear idler wheel $M_R$ is omitted in low-sprocket configuration and the bushings, not links 20, engage sprocket 18) and, accordingly, the combined amount of height reduction should be divided by one to determine the average height reduction of each individual link 20. This process may be repeated for each pair of links 20, as they move past front and/or rear idler wheels $26_F$, $26_R$ (i.e., as they become generally perpendicular to actuator 28). In this manner, variability in the wear of links 20 can be estimated.

Controller 34 may selectively generate a message directed to offboard entity 42 via communication device 44, depending on the calculated height of individual pairings of links 20. For example, controller 34 may selectively generate a message directed to service personnel indicating that links 20 are worn and should be replaced. Controller 34 may generate this message when the average height of links 20 (e.g., when the average height of at least one pairing of links 20 within at least one chain 24) falls below a threshold value. Upon receiving the message, the service personnel may provide a quote to the owner of machine 10 for replacement parts and service. In addition, the service personnel may schedule replacement of the worn components.

Because the disclosed system may track the wear of undercarriage components, it may be more likely that machine 10 is serviced at the appropriate time. That is, as soon as it is determined that links 20 are worn and should be replaced, the process of servicing machine 10 may immediately begin at the next regular downtime of machine 10. This may help to reduce the likelihood of machine damage caused by operating with worn components and thereby increase machine life. In addition, it may be more likely that the contacted service personnel receive the service contract associated with replacement of the worn components, as the service personnel should be the first entity to provide the service quote to the machine owner.

In some embodiments, controller 34 may also be configured to regulate tensioning of track 16. In particular, based on signals from sag sensor 33, controller 34 may determine when the sag of track 16 exceeds an acceptable sag value. In response to this determination, controller 34 may automatically cause actuator 28 to extend and push front idler wheel $26_F$ away from rear idler wheel $26_R$, until the sag value is about equal to or less than the acceptable sag value. It is contemplated that controller 34 could alternatively alert the service personnel of offboard entity 42 of the need to manually increase the tension on track 16, if desired.

It will be apparent to those skilled in the art that various modifications and variations can be made to the disclosed wear monitoring system. Other embodiments will be apparent to those skilled in the art from consideration of the specification and practice of the disclosed wear monitoring system. It is intended that the specification and examples be considered as exemplary only, with a true scope being indicated by the following claims and their equivalents.

What is claimed is:
1. A wear monitoring system for a track type mobile machine, comprising:
at least a first radius sensor configured to generate a first signal indicative of a change in radius of at least one idler wheel;
a displacement sensor configured to generate a second signal indicative of a change in displacement of a track tensioning actuator; and
a controller in communication with the first radius sensor and the displacement sensor, the controller being configured to determine wear of a track link guided by the at least one idler wheel and tensioned by the track tensioning actuator based on the first and second signals.
2. The wear monitoring system of claim 1, wherein:
the at least one idler wheel includes a first idler wheel and a second idler wheel;
the at least a first radius sensor includes:
a first radius sensor associated with the first idler wheel and configured to generate the first signal; and a second radius sensor associated with the second idler wheel and configured to generate a third signal indicative of a change in radius of the second idler wheel; and the controller is configured to determine the wear of the track link based on the first, second, and third signals.

3. The wear monitoring system of claim 1, wherein the controller is configured to determine the wear of the track link as a difference of the change in displacement and the change in radius.

4. The wear monitoring system of claim 1, further including a communication device, wherein the controller is connected with the communication device and configured to selectively generate a message directed to an offboard entity when the wear of the track link exceeds a threshold value.

5. The wear monitoring system of claim 1, wherein the controller is further configured to selectively activate the track tensioning actuator to increase a tension in the track link.

6. The wear monitoring system of claim 1, wherein the wear determined by the controller based on the first and second signals is an average of wear within two links of a pair of links that are pinned to each other and coupled to a common track shoe.

7. The wear monitoring system of claim 2, wherein the first and second radius sensors are ultrasonic sensors having transducers embedded within the first and second idler wheels, respectively.

8. The wear monitoring system of claim 3, wherein the controller is configured to determine the wear of the track link as one-half of the difference of the change in displacement and the change in radius.

9. The wear monitoring system of claim 5, further including a track sag sensor, wherein the controller is configured to selectively activate the track tensioning actuator based on a signal generated by the track sag sensor.

10. The wear monitoring system of claim 6, wherein the controller is configured to determine the average wear of every pair of links within each chain of mobile machine.

11. A method of monitoring component wear of a track type machine, the method comprising:

sensing, using a radius sensor, a change in radius of at least one idler wheel of the track type machine;

sensing, using a displacement sensor, a change in displacement of a track tensioning actuator of the track type machine; and determining, using a controller, wear of a track link of the track type machine guided by the at least one idler wheel and tensioned by the track tensioning actuator based on the change in radius and the change in displacement.

12. The method of claim 11, wherein:

sensing the change in radius includes sensing the change in radius of a first idler wheel and a second idler wheel; and determining the wear of the track link includes determining the wear based on the change in radius of the first idler wheel, the change in radius of the second idler wheel, and the change in displacement.

13. The method of claim 11, wherein determining the wear of the track link includes determining the wear as a difference of the change in displacement and the change in radius.

14. The method of claim 11, further including transmitting a message to service personnel directing the service personnel to provide a quote for a replacement track link and/or to schedule servicing of the track type machine.

15. The method of claim 11, further including:

sensing track sagging; and selectively increasing tension in the track link based on the sensed track sagging.

16. The method of claim 11, wherein determining wear of a track link includes determining average wear in two track links of a pair of track links that are pinned together and connected to a common track shoe.

17. The method of claim 13, wherein determining the wear of the track link includes determining the wear as one-half of the difference of the change in displacement and the change in radius.

18. The method of claim 16, further including determining the average wear in every pair of track links within each chain of the track type machine.

19. The method of claim 18, further including transmitting a message to service personnel when the average wear of at least one pair of at least one chain exceeds a threshold amount.

* * * * *